(12) United States Patent
Berke et al.

(10) Patent No.: US 8,806,254 B2
(45) Date of Patent: Aug. 12, 2014

(54) SYSTEM AND METHOD FOR CREATING AND DYNAMICALLY MAINTAINING SYSTEM POWER INVENTORIES

(75) Inventors: Stuart Allen Berke, Austin, TX (US); Mukund P. Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 272 days.

(21) Appl. No.: 13/019,099

(22) Filed: Feb. 1, 2011

(65) Prior Publication Data

US 2012/0198263 A1    Aug. 2, 2012

(51) Int. Cl.
*G06F 1/00* (2006.01)
*G06F 1/32* (2006.01)

(52) U.S. Cl.
USPC ............................................. 713/340; 713/320

(58) Field of Classification Search
USPC .................................................. 713/320, 340
See application file for complete search history.

(56) References Cited

U.S. PATENT DOCUMENTS

| | | | |
|---|---|---|---|
| 3,736,569 A | 5/1973 | Bouricius et al. | |
| 4,747,041 A | 5/1988 | Engel et al. | |
| 4,998,024 A | 3/1991 | Kirk et al. | |
| 5,414,860 A | 5/1995 | Canova, Jr. et al. | |
| 5,560,022 A | 9/1996 | Dunstan et al. | |
| 7,043,650 B2 | 5/2006 | Bresniker et al. | |
| 7,080,267 B2 | 7/2006 | Gary et al. | |
| 7,346,787 B2 * | 3/2008 | Vaidya et al. | 713/300 |
| 8,065,540 B2 * | 11/2011 | Sultenfuss | 713/320 |
| 8,097,979 B2 | 1/2012 | Berke et al. | |
| 8,135,970 B2 * | 3/2012 | Gaskins et al. | 713/322 |
| 8,225,112 B2 * | 7/2012 | Koul et al. | 713/300 |
| 8,341,433 B2 * | 12/2012 | Artman et al. | 713/300 |
| 2006/0123252 A1 * | 6/2006 | Vaidya et al. | 713/300 |
| 2007/0283178 A1 * | 12/2007 | Dodeja et al. | 713/324 |
| 2008/0098242 A1 * | 4/2008 | Peterson | 713/320 |
| 2008/0162675 A1 * | 7/2008 | Bolay et al. | 709/221 |
| 2009/0259869 A1 * | 10/2009 | Naffziger | 713/340 |
| 2010/0191989 A1 * | 7/2010 | Khatri et al. | 713/310 |
| 2010/0191997 A1 * | 7/2010 | Dodeja et al. | 713/323 |
| 2010/0292854 A1 * | 11/2010 | Burg et al. | 700/291 |
| 2012/0016606 A1 * | 1/2012 | Petit et al. | 702/61 |

* cited by examiner

*Primary Examiner* — Paul R Myers
*Assistant Examiner* — Christopher A Daley
(74) *Attorney, Agent, or Firm* — Baker Botts L.L.P.

(57) ABSTRACT

In accordance with the present disclosure, a system and method for creating and dynamically maintaining power inventories of an information handling system is presented. A system for creating and dynamically maintaining power inventories of an information handling system may include a memory and a processor. The processor may be operable to generate power inventories for the information handling system and save the power inventories in the memory. Each of the power inventories may correspond to one of the power states of the information handling system. The processor may also be operable to dynamically update each of the saved power inventories in response to changes in the information handling system.

20 Claims, 3 Drawing Sheets

SYSTEM AND METHOD FOR CREATING AND DYNAMICALLY MAINTAINING SYSTEM POWER INVENTORIES

TECHNICAL FIELD

The present disclosure relates generally to the operation of computer systems and information handling systems, and, more particularly, to a System and Method for Creating and Dynamically Maintaining System Power Inventories.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system may include numerous elements which require power to operate, including processors, hard disk drives, DVD-drives, fans, etc. Existing information handling systems attempt to optimize the power use according to the configuration of the elements in the information handling system. The optimization may include the creation of a power inventory, which reflects the maximum power consumption for the configuration of the information handling system identified during a boot process. One problem with an existing power inventory is that it does not reflect changes in system configuration after the boot process is complete. Instead, current information handling systems must add a guard-band of extra power into the power inventory to account for changes in the system, leading to an inefficient use of power and a decrease in the accuracy of the power inventory. Another problem with an existing power inventory is that it is typically limited to modeling the power consumption at a particular utilization, such as 100%, and does not account for other utilizations, configurations, and states of the information handling system.

SUMMARY

In accordance with the present disclosure, a system and method for creating and dynamically maintaining power inventories of an information handling system is presented. A system for creating and dynamically maintaining power inventories of an information handling system may include a memory and a processor. The processor may be operable to generate power inventories for the information handling system and save the power inventories in the memory. Each of the power inventories may correspond to one of the power states of the information handling system. The processor may also be operable to dynamically update each of the saved power inventories in response to changes in the information handling system.

The system and method disclosed herein is technically advantageous because it provides a method for creating and dynamically maintaining power inventories. According to aspects of the invention, each power state and utilization of an information handling system may correspond to a separate power inventory. Likewise, each power inventory may include entries regarding the overall power consumption and the power consumption of each sub-system found in the information handling system. This is advantageous because it can be used in advanced power management applications to monitor and limit power consumption per sub-system per power state. Additionally, unlike existing power inventories, the present invention dynamically updates the power inventories in the system, which allows the information handling system to increase the accuracy of the power inventories by reducing or eliminating the use of guard-bands. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
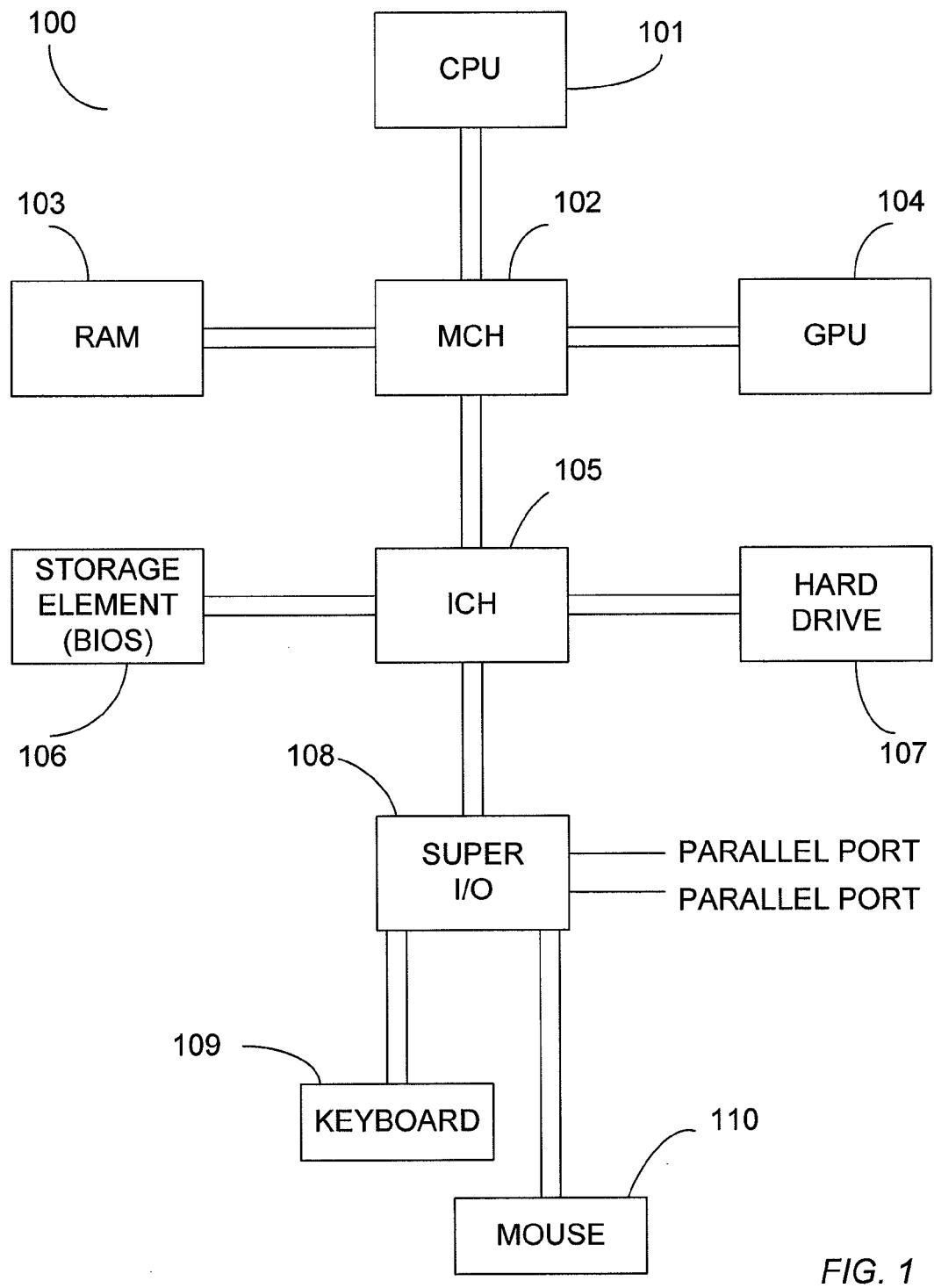
FIG. 1 is a block diagram of the components of an information handling system.

Shown in FIG. 1 is a block diagram of a typical information handling system 100. A processor or CPU 101 of the typical information handling system 100 is communicatively coupled to a memory controller hub or north bridge 102. Memory controller hub 102 is coupled to RAM 103 and a graphics processing unit 104. Memory controller hub 102 is also coupled to an I/O controller hub or south bridge 105. I/O hub 105 is coupled to storage elements of the computer system, including a storage element 106, which may comprise a flash ROM that includes the BIOS of the computer system. I/O hub 105 is also coupled to the hard drive 107 of the computer system. I/O hub 105 may also be coupled to a Super I/O chip 108, which is itself coupled to several of the I/O ports of the computer system, including keyboard 109, mouse 110, and one or more parallel ports.

The system and method presented herein involves creating and dynamically maintaining power inventories for an information handling system like the one shown in FIG. 1. The power inventories may be used to optimize the power and performance of the information handling system. Each of the power inventories may correspond to the power consumption of an information handling system in one of numerous system power states and utilizations. Each of the power inventories may include entries corresponding to both the overall system power consumption and the power consumption of sub-systems of the information handling system. The information handling system may further recognize changes in system configuration and dynamically update each of the power inventories for the information handling system in response to a change.

Figure 2:
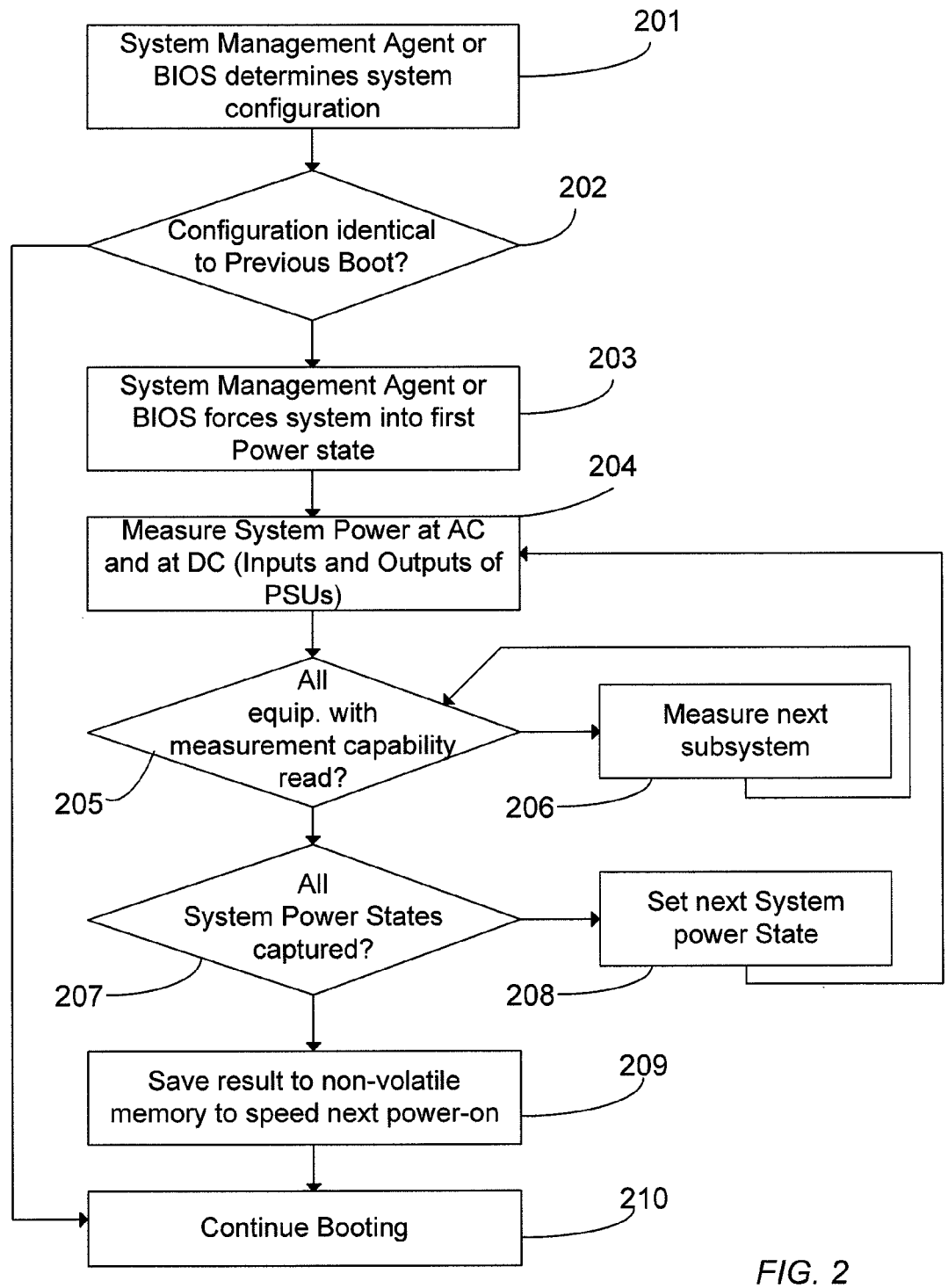
FIG. 2 is a flow diagram for a method of generating power inventories according to one aspect of the present invention.

FIG. 2 is a flow chart of a method for generating a plurality of power inventories for power states of an information handling system, according to one aspect of the present invention. At step 201, a system management agent or BIOS determines a system configuration. The system configuration may be determined through the use of a power-on self test (POST) of a system BIOS, which discovers and initializes elements of an information handling system, including busses, memory, and other devices. The POST may generate results, which may be saved to non-volatile memory within the system and used during the process to identify the components within the information handling system.

At step 202, the system identifies whether the configuration determined in step 201 is identical to the last determined system configuration. Step 202 may include comparing, using one or more system processors, the results of the POST from step 201 with the results from the POST of a previous boot sequence, which may have been saved at a pre-determined location within non-volatile memory, such as the FlashROM 50 from FIG. 1. In other embodiments, the last determined system configuration may have been determined during system run-time rather than during the boot process. If the configurations are identical, it is likely that the system power inventories would also be identical, allowing the information handling system to skip to step 209 and save time during the boot process.

If the system configurations are not identical, then the power inventories need to be changed and/or updated. The process of changing/updating the power inventories begins by placing the information handling system into a first power state at step 203. Power states of the information handling system may include some or all of the power states defined in the Advanced Configuration and Power Interface ("ACPI") standard (e.g., off-states S3, S4, and S5, and processor and package C-states C6/7, C1E, and C0 idle) as well as various operating system level utilizations (e.g., low, 50%, and 100%). A first power state may be arbitrarily chosen from any of the power states or utilizations mentioned above or any other power state or utilization well known in the art, as the method of FIG. 1 eventually places the system in each available power state and utilization.

After the information handling system is placed into a first power state, the power consumption of the entire system may be measured. In one embodiment, the power consumption may be measured at both AC and DC, or at both the input and output of a power supply unit for the information handling system. Other embodiments may measure the power consumption of the overall system using one of a variety of measurement techniques that are well known in the art. After the measurement is complete, the results may be saved to temporary memory and then saved to non-volatile memory once all of the system measurements described below have been taken. In other embodiments, the measurement may be saved directly into nonvolatile memory. In either case, the measurement is part of a power inventory that corresponds to the first power state.

The method continues at step 205, where the information handling system checks whether each of the sub-systems of the information handling system have been measured. The sub-systems may include elements or combinations of elements of the information handling system that are identified during the POST, and may represent large sub-systems, such as memory, processing, etc. In one embodiment, the sub-systems may be determined by the location of equipment with measurement capability, such as voltage rails and voltage regulators, within the system. For example, if the equipment with measurement capability is coupled to large elements (e.g. entire memory device, zones of IO slots, zones of HDD slots, etc.), then each sub-system may be comprised of one of the large elements. In contrast, if the information handling system includes equipment with measurement capability coupled to small elements (e.g. individual CPU sockets, memory zones, individual IO slots, individual HDD slots, etc.), then each sub-system may be comprised of one of the small elements. In other embodiments, the sub-systems may include some combination of large and small elements depending on the granularity of the inventory chosen by a user.

In one embodiment, Step 205 may determine whether each sub-system has been measured by determining whether each piece of equipment with measurement capability has been read. If it each piece of equipment with measurement capability has not been read, the method progresses to step 206, where the system reads an unread piece of equipment with measurement capability. The process continues in this manner until each piece of equipment with measurement capability has been read (and hence each sub-system has been measured), at which point the method proceeds to step 207.

At step 207, the information handling system determines whether the power consumption at each of the system power states has been measured. The information handling system may determine this by iteratively progressing through a list of power states located, for example, on non-volatile memory within the information handling system. If each system power state has not been captured, the system may place the information handling system in the next power state in step 208. Once the system in is the next power state, the system may then measure the power consumption of the overall system in step 204, as before, and then proceed to measure the power consumption of each sub-system via steps 205 and 206. The information handling system may continue in this manner until each of the system power states has a corresponding power inventory that includes the overall system power consumption and the power consumption of each subsystem of the information handling system.

In one embodiment of the invention, the measurement process may be controlled by a set of parameters entered by a user of the information handling system ("user policy"). The user policy may be entered via a GUI and data input means, such as a mouse and keyboard, or any other well known mechanism for entering parameters into an information handling system. The user policy may set and constrain a variety of measurement functions in the BIOS. Preferably, the user policy can determining how long the information handling system should take to perform each of the measurements. In some instances, a user may prefer that the measurement time be decreased to allow the information handling system to boot faster. In those instances, the user may enter parameters which decrease the amount of time the measurement process can take. Decreasing the measurement time, however, will generally decrease the accuracy of the power inventories generated by the measurement process.

After each system power state has been measured, the power inventories may be saved in memory of the information handling system at step 209. In one embodiment, the power inventories are saved in non-volatile memory, which is advantageous because the power requirements may be reused upon the next system boot if the configuration of the information handling system has not changed. In an alternative embodiment, once the measurements for each power state has been completed, each power inventory may be saved to memory separately, instead of being saved as a group after each power state has been measured.

Once the results are saved in step 209, the system may continue a normal boot process, as indicated at step 210. Although the method of FIG. 1 is shown within the context of a boot process, other embodiments may implement the method in pre-boot, in uEFI, and post boot. In post boot embodiments, the system may proceed to normal use of the information handling system instead of continuing the boot process.

Figure 3:
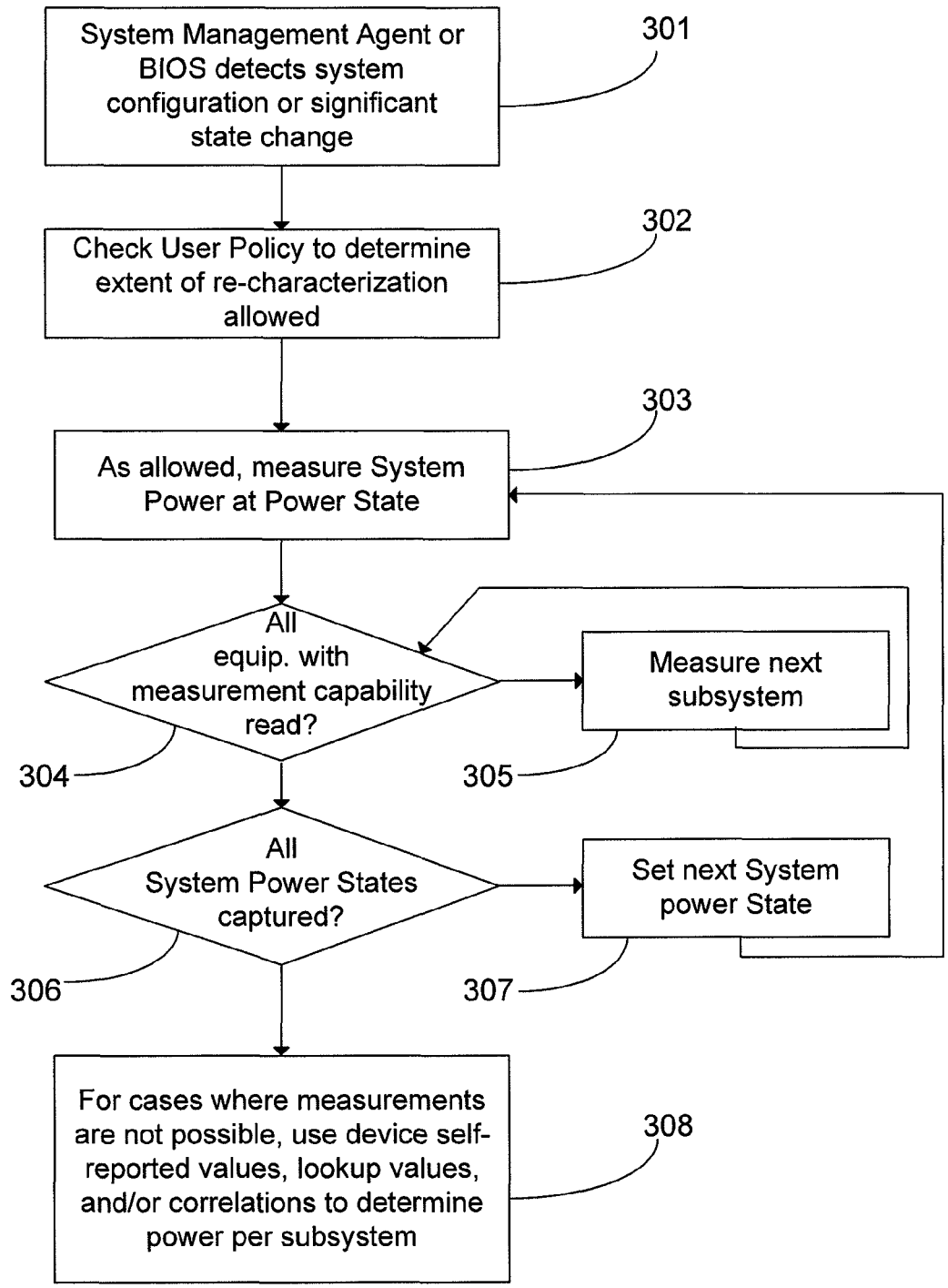
FIG. 3 is a flow diagram for a method of dynamically updating the power inventories in an information handling system according to one aspect of the present invention.

In another aspect of the present invention, each of the power inventories generated according to the flowchart of FIG. 2 may be updated dynamically according to the method shown in FIG. 3. The method illustrated in FIG. 3 may be accomplished during run-time processes of an information handling system, meaning after the boot processes have been completed. At step 301, the system management agent or BIOS may detect a change in the system configuration or a significant state change in the information handling system. Configuration changes may be the result of any number of device changes or power management changes that alter the power requirements for the information handling system. These changes may include, for example, hot plugging or removing a device, disabling/enabling/power managing a device, or powering on/off devices. A state change may also reflect a user invoked power inventory and re-calibration of the power levels.

At step 302, the information handling system may check a user policy to determine the extent of re-characterization allowed. This user policy may reflect the parameters discussed above with regards to the measurement process of FIG. 2. In addition, the user policy may include a plurality of inventory policies, which limit the amount of time allowed for characterizing the systems during POST, pre-Boot, or during OS initialization; the time limit allowed to characterize components as they are hot plugged into a running system; and how specific the inventory should be (e.g. per CPU socket, per memory zone, per voltage rail, etc.) based on the sub-system measurement capability.

Depending on and according to the user policy, the system may undertake updating the power inventories of the system using a same or similar process as the one shown in FIG. 2. In particular, the system may be placed into a first power state and measured at step 303 and each sub-system of the information handling system may be subsequently measure through iterative steps 304 and 305. After each sub-system has been measured, the information handling system may check to see if the power consumption of each power state has been captured at step 306. If the power consumption of each power state has not been captured, the system may be placed into another power state, and the measurement process of steps 303-305 may be repeated. The process of steps 303-307 may be repeated until the power inventory for each power state in the system has been updated.

In some instances, the system may not be able to update the power inventories through measurement. For example, a hot-plugged device may not include equipment with measurement capability. Where measurement is not possible, the power consumption per each sub-system may be updated, for example, using device self-reported values, lookup table values, and/or correlations to other system devices, as shown in step 308. In one embodiment, for each power inventory, the elements of each sub-system are tracked as to whether they are measured in-system, provided by the subsystem components, provided by built-in system tables, estimated by supplier datasheet or industry standards, or are estimated based on correlative factors. This is advantageous because it allows the information handling system include an appropriate level of margin for each value depending on the source.

The power inventories generated according to the methods of FIGS. 2 and 3 may be advantageously utilized in a variety of advanced power capping applications. Power caps may be set by a user and may reflect a user's choices regarding thermal output, power consumption, and acoustic output. Existing computing systems allow users to cap the power consumption of the entire system, but do not allow for advanced power capping because the computing systems do not maintain accurate models of each power state and each subsystem in each state. In contrast, the power inventories of the present application allow a user to define a usage model which caps the power consumption of the entire system as well as cap the power consumption of the power states and the power consumption of all or some of the sub-systems in each of the power states. Various other usage models are possible, including maintaining a system power consumption below a power supply's maximum output rating, setting and maintaining cooling limitations for a chassis or sub-chassis, setting and maintaining datacenter and rack power and cooling limitations, maintaining a maximum outlet temperature, and maintaining a maximum acoustic limit.

Although the present disclosure has been described in detail, it should be understood that various changes, substitutions, and alterations can be made hereto without departing from the spirit and the scope of the invention as defined by the appended claims.

What is claimed is:

1. A system for creating and dynamically maintaining power inventories of an information handling system, comprising:
   a memory;
   a processor, wherein the processor is operable to,
   execute instructions to generate power inventories for an information handling system and save the power inventories in the memory, wherein each of the power inventories corresponds to one of a plurality of power states of the information handling system and wherein the power inventories include one or more entries corresponding to overall power consumption of the information handling system; and execute instructions to dynamically update each of the saved power inventories in response to changes in the information handling system, wherein the instructions to dynamically update include instructions to update the power inventories when configuration changes are detected in the information handling system during boot-up of the information handling system, and wherein dynamically updating allows the information handling system to increase accuracy of the power inventories by at least achieving one of a reduction or elimination of power guard-bands.

2. The system of claim 1, wherein each of the power inventories includes a power consumption of the information handling system operating in one of the plurality of power states.

3. The system of claim 2, wherein each of the power inventories includes a power consumption of a sub-system of the information handling system.

4. The system of claim 3, wherein the processor is further operable to execute instructions to limit the power consumption of one of the sub-systems of the information handling system according, in part, to one of the saved power inventories and a power cap chosen by a user.

5. The system of claim 1, wherein the instructions to generate power inventories are executed during a boot process of the information handling system.

6. The system of claim 1, wherein the instructions to dynamically update each of the generated power inventories are executed during run-time processes of the information handling system.

7. The system of claim 1, wherein changes in the information handling system include hot-plugging, removing, disabling, enabling, and power managing a device.

8. A computer-readable storage medium encoded with processing instructions for implementing a method for creating and dynamically maintaining power inventories of a computer, the processing instructions for directing a computer to perform the steps of:

generating a plurality of power inventories for the computer, wherein each of the plurality of power inventories includes a power consumption of the computer operating in one of a plurality of power states and wherein the power inventories include one or more entries corresponding to overall power consumption of the information handling system;

saving the plurality of power inventories in a memory location of the computer; and dynamically updating each of the power inventories in response to a change in configuration of the computer, wherein dynamically updating includes updating the power inventories when configuration changes are detected in the information handling system during boot-up of the information handling system, and wherein dynamically updating allows the information handling system to increase accuracy of the power inventories by at least achieving one of a reduction or elimination of power guard-bands.

9. The computer-readable storage medium of claim 8, wherein each of the plurality of power states of the computer corresponds to one of the plurality of power inventories.

10. The computer-readable storage medium of claim 8, wherein the step of generating a plurality of power inventories for the computer includes measuring the input and output of a power supply unit of the computer.

11. The computer-readable storage medium of claim 8, wherein each of the plurality of power inventories includes a power consumption of each sub-system of the computer.

12. The computer-readable storage medium of claim 11, wherein the step of generating a plurality of power inventories for the computer includes reading from equipment with measurement capability coupled to each sub-system of the computer.

13. The computer-readable storage medium of claim 8, wherein changes in the computer include hot-plugging, removing, disabling, enabling, and power managing a device.

14. The computer-readable storage medium of claim 8, wherein the steps of generating the plurality of power inventories and dynamically updating each of the power inventories may be limited by a user policy.

15. The computer-readable storage medium of claim 8, wherein the step of generating the plurality of power inventories may be performed pre-boot, in uEFI, and post-boot.

16. A system for creating and dynamically maintaining power inventories of an information handling system, comprising:

a memory;

a processor, wherein the processor is operable to,
execute instructions to place an information handling system in a first power state;
execute instructions to measure a power consumption of the information handling system operating in the first power state;
execute instructions to measure the power consumption of each sub-system of the information handling system operating in the first power state;
execute instructions to combine each of the measured power consumptions into a first power inventory and save the first power inventory at a memory location of the information handling system, wherein the first power inventory includes information corresponding to overall power consumption of the information handling system; and
execute instructions to update the first power inventory when configuration changes are detected in the information handling system during boot-up of the information handling system, and wherein dynamically updating allows the information handling system to increase accuracy of the power inventories by at least achieving one of a reduction or elimination of power guard-bands.

17. The system of claim 16, wherein the processor is operable to repeat the instructions for each power state of the information handling system.

18. The system of claim 17, wherein the first power inventory is included in a plurality of power inventories corresponding to each of the power states of the information handling system.

19. The system of claim 18, wherein the processor is further operable to execute instructions to dynamically update each of the plurality of power inventories in response to a change in configuration of the information handling system.

20. The system of claim 19, wherein a change in configuration may result from a user request to update the plurality of power inventories.

* * * * *